March 22, 1927.  W. BURLINGHAM ET AL  1,622,023
COMPRESSOR FOR REFRIGERATING SYSTEMS
Filed Dec. 31, 1924  13 Sheets-Sheet 8
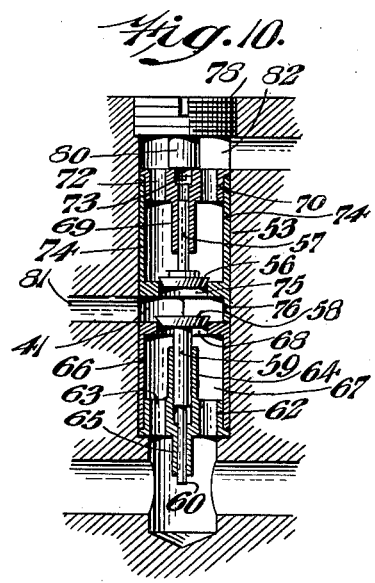
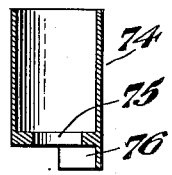
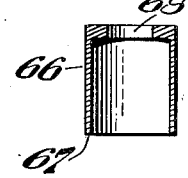
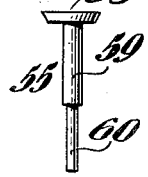
INVENTORS
Ralph L. Lovell
William Burlingham
BY
ATTORNEYS.

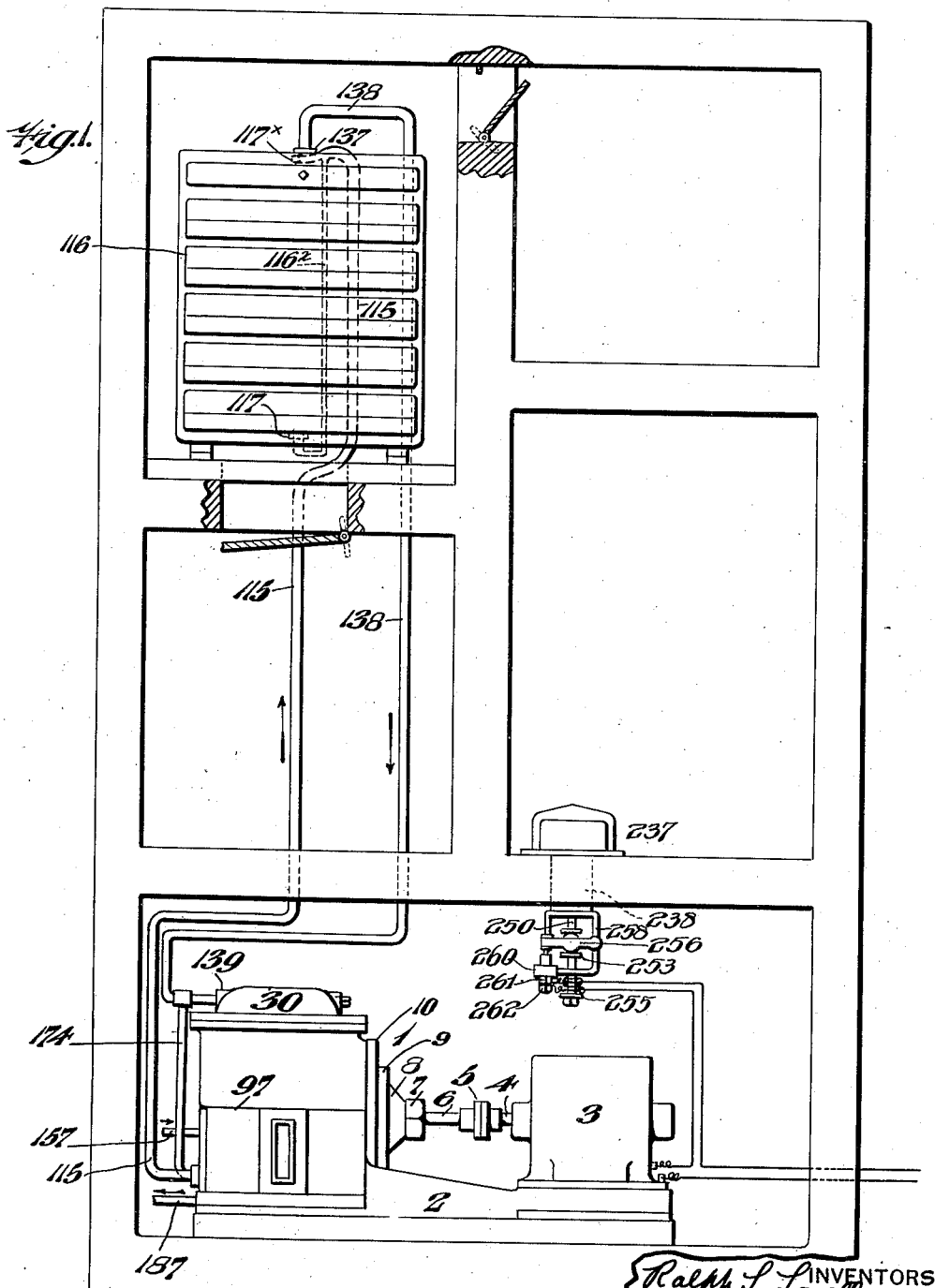

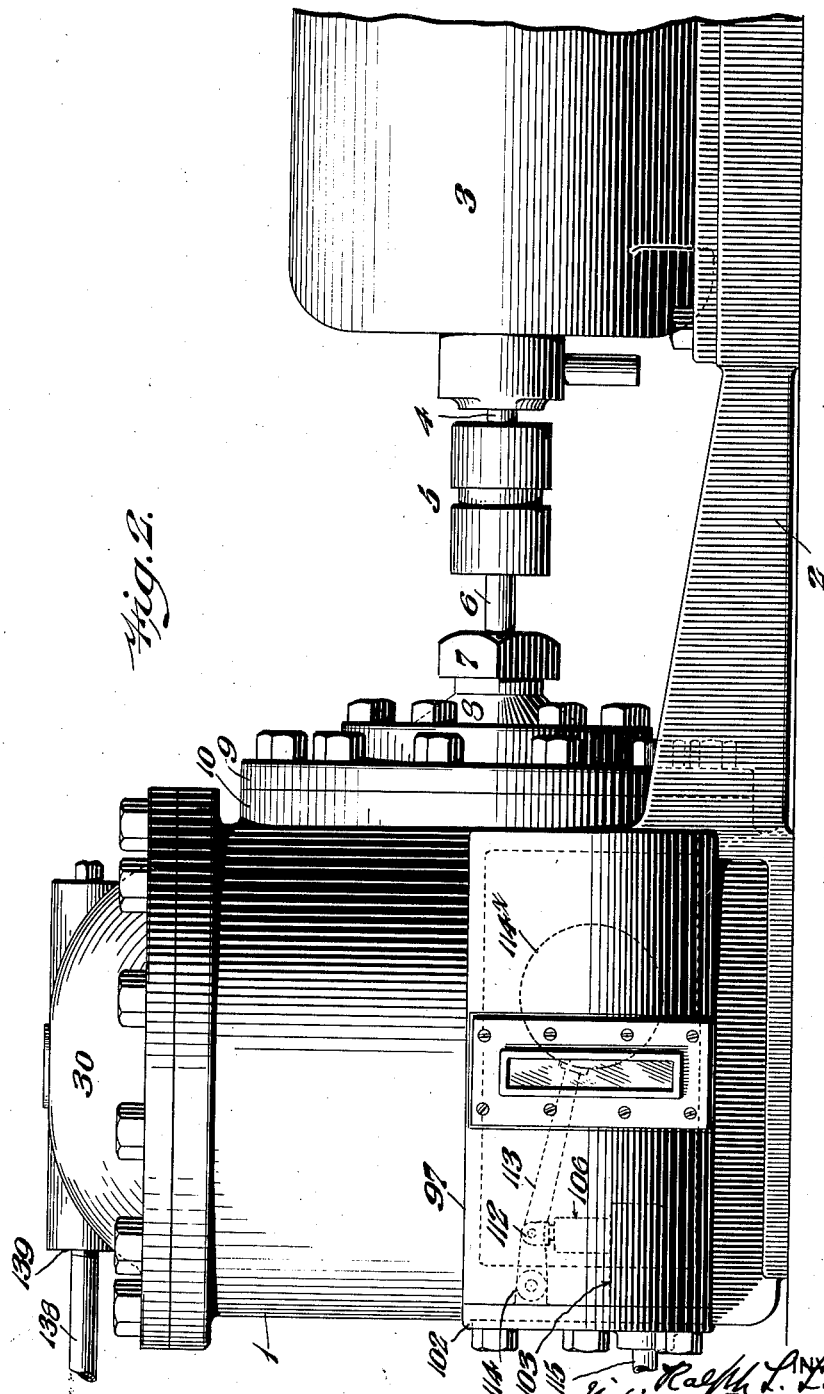

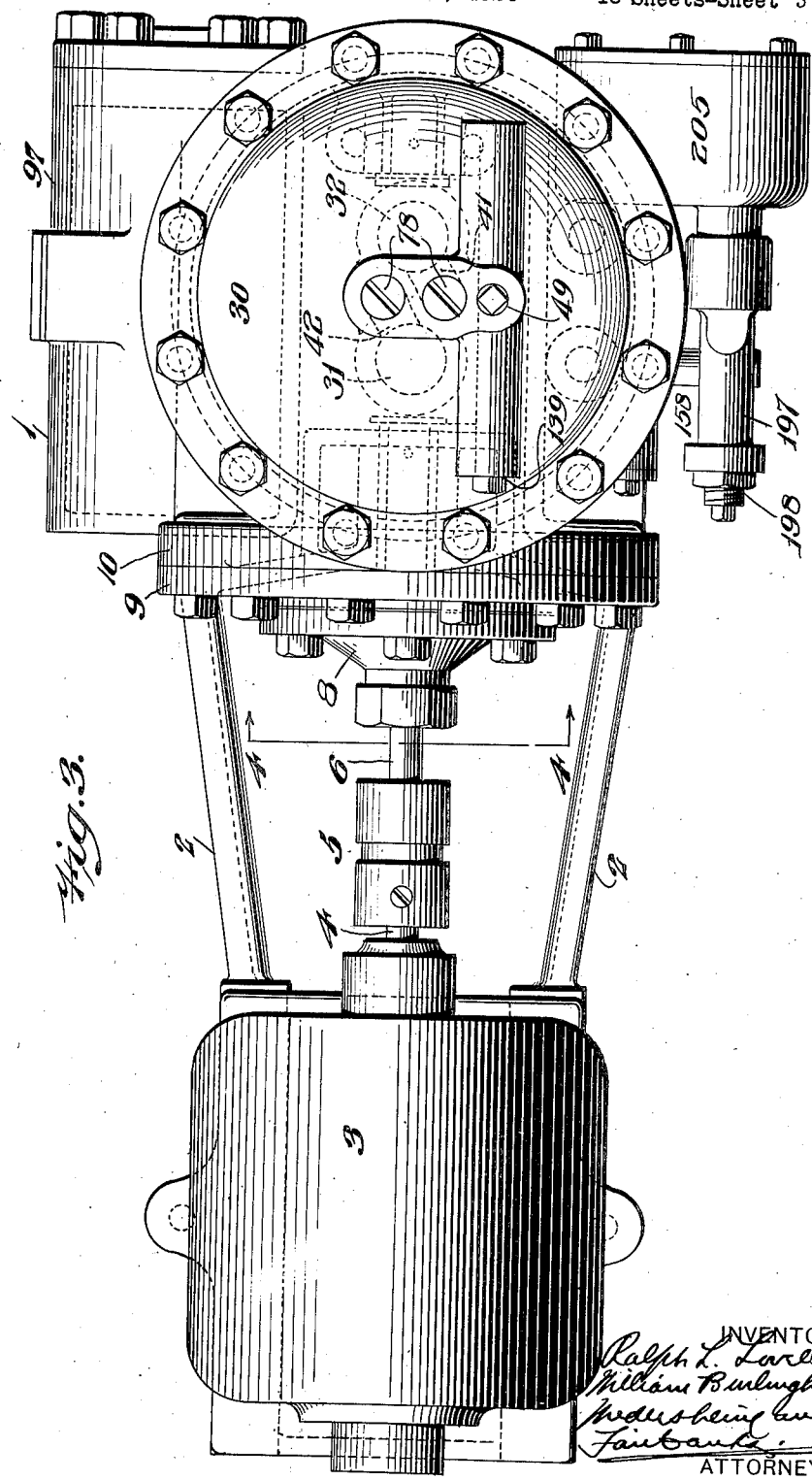

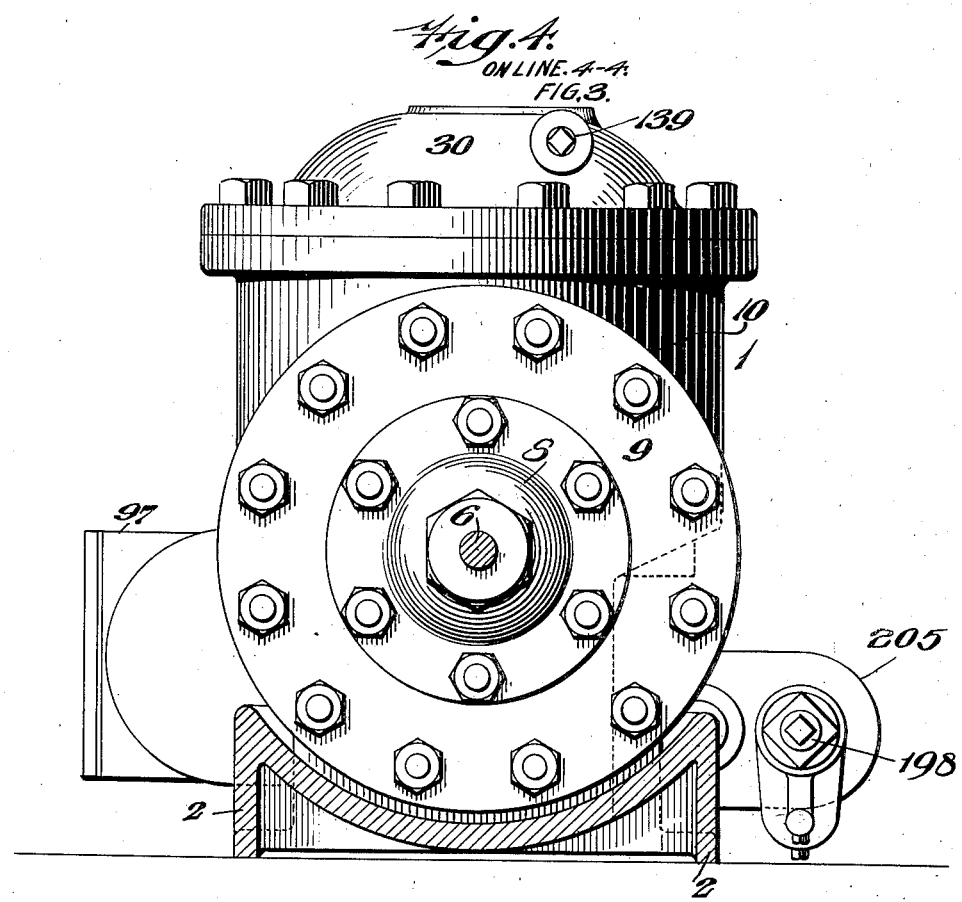

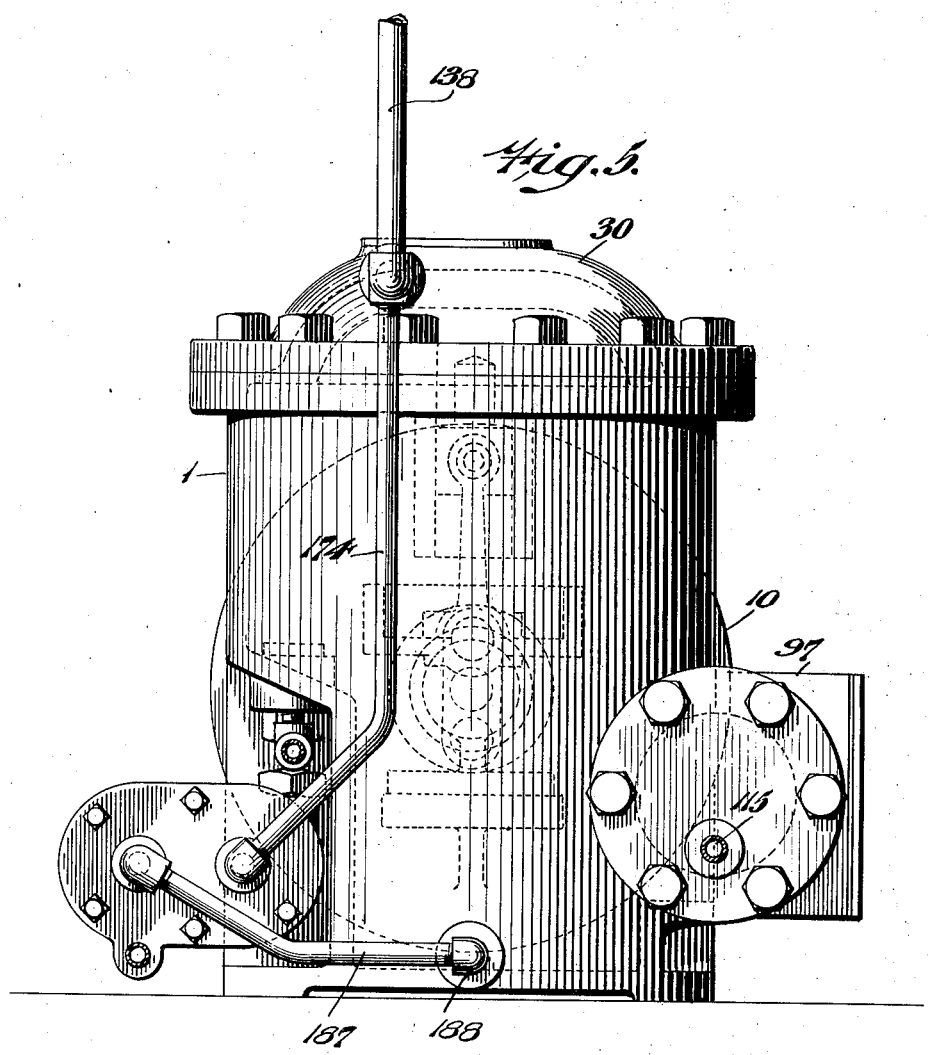

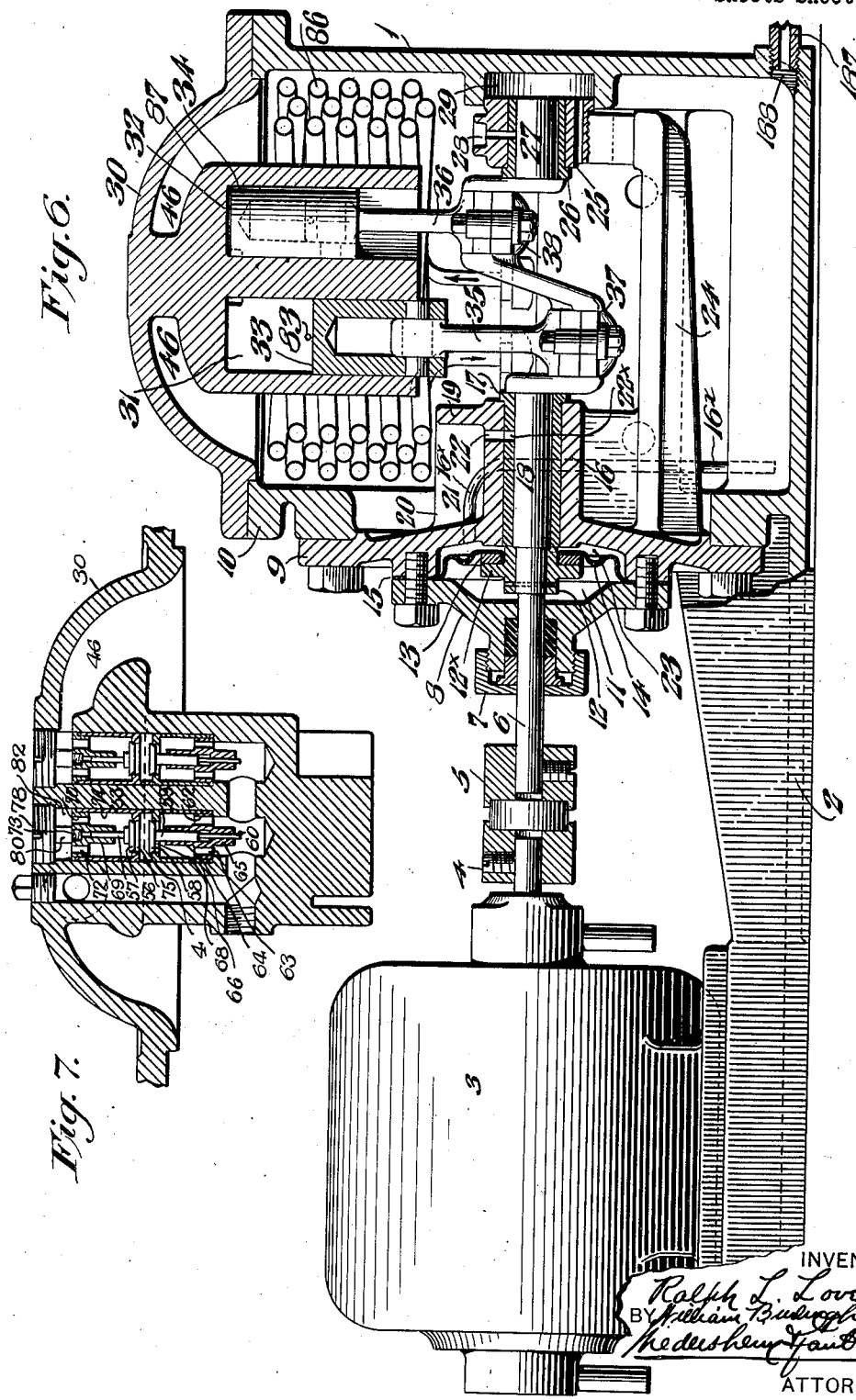

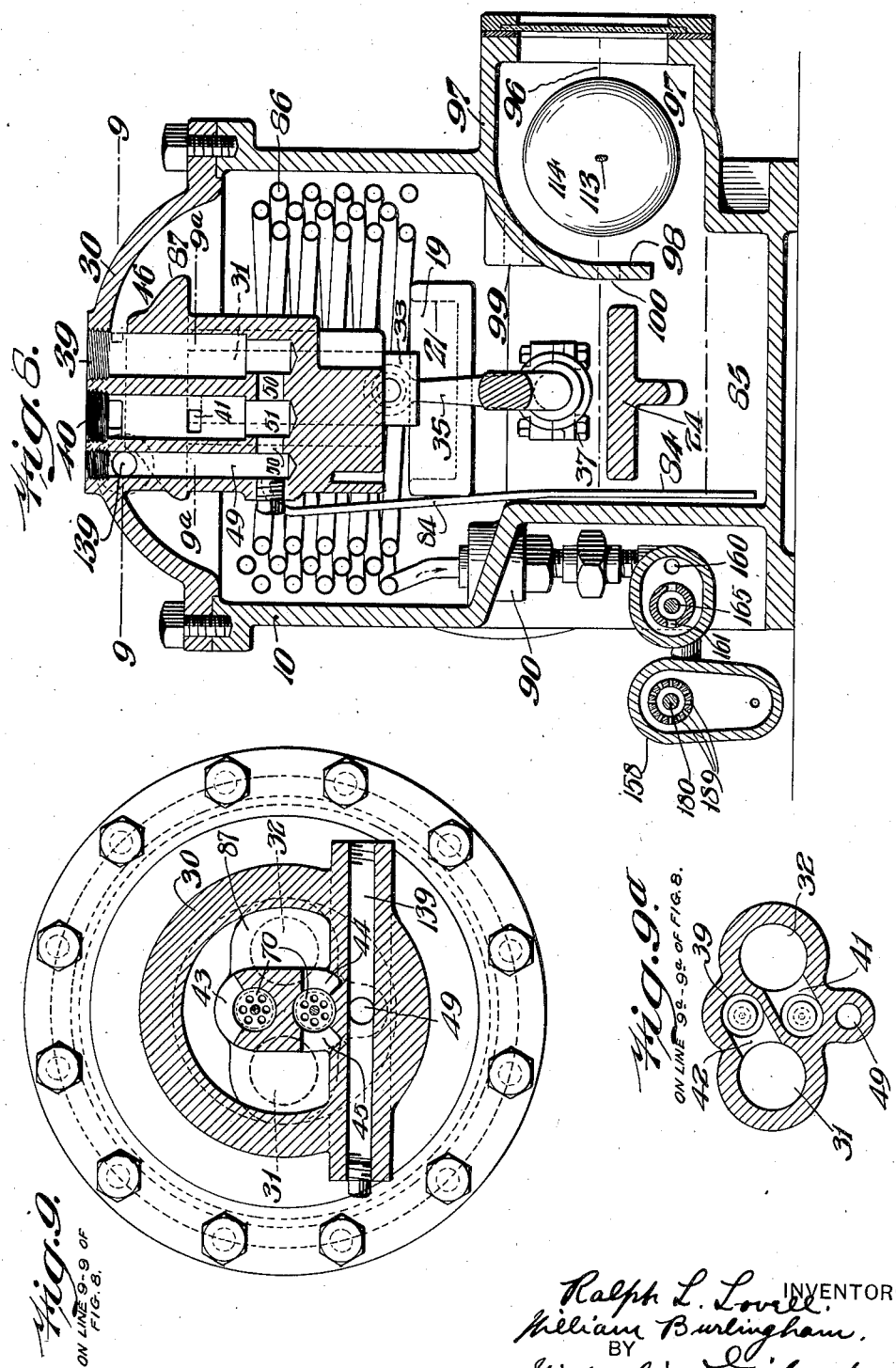

March 22, 1927.
W. BURLINGHAM ET AL
1,622,023
COMPRESSOR FOR REFRIGERATING SYSTEMS
Filed Dec. 31, 1924    13 Sheets-Sheet 9
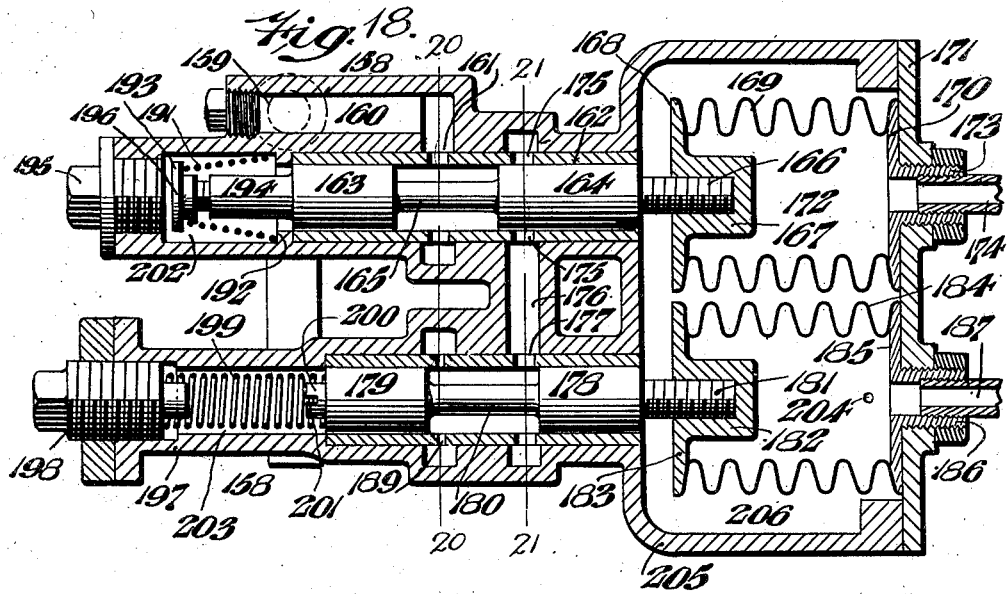
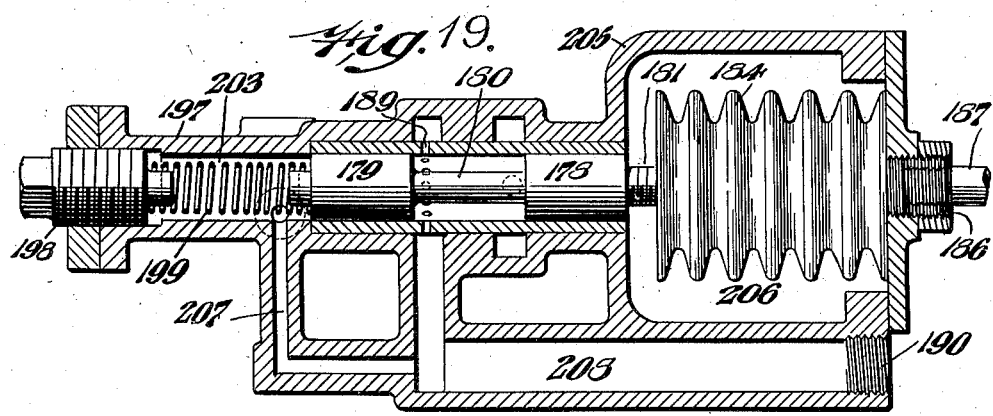
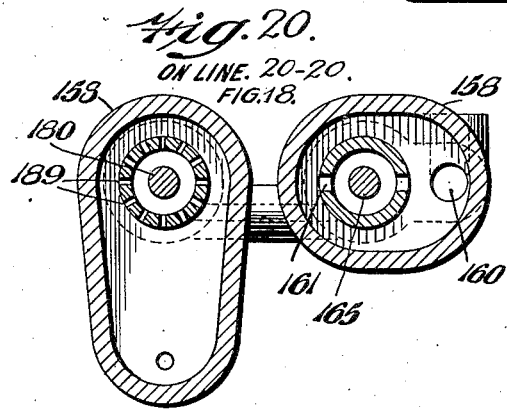
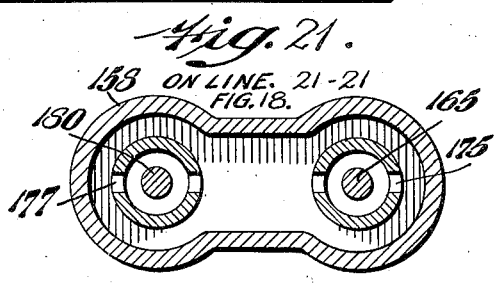
INVENTORS
Ralph L. Lovell
William Burlingham
BY
Wiedersheim Fairbanks
ATTORNEYS.

March 22, 1927.  1,622,023
W. BURLINGHAM ET AL
COMPRESSOR FOR REFRIGERATING SYSTEMS
Filed Dec. 31, 1924    13 Sheets-Sheet 10
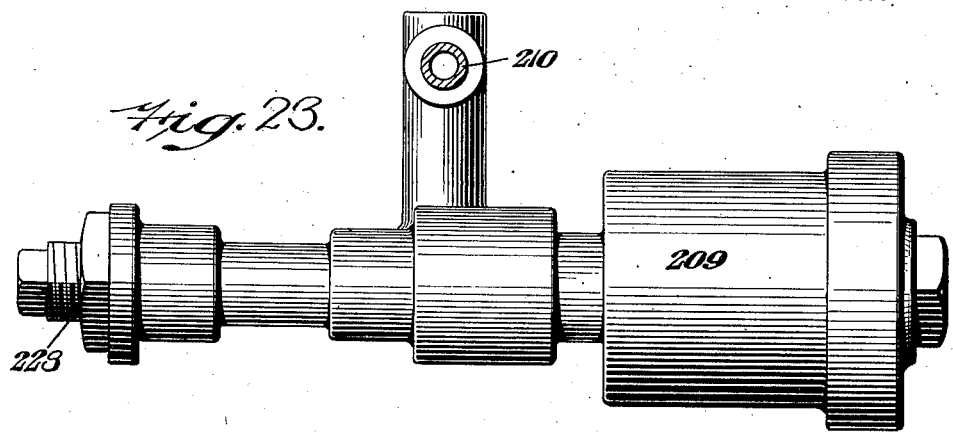
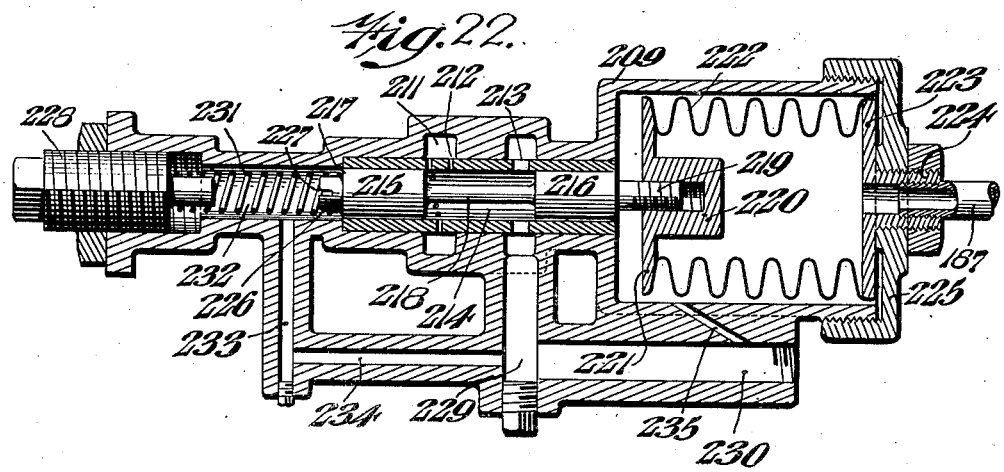
INVENTORS
Ralph L. Lovell,
William Burlingham.
BY
ATTORNEYS.

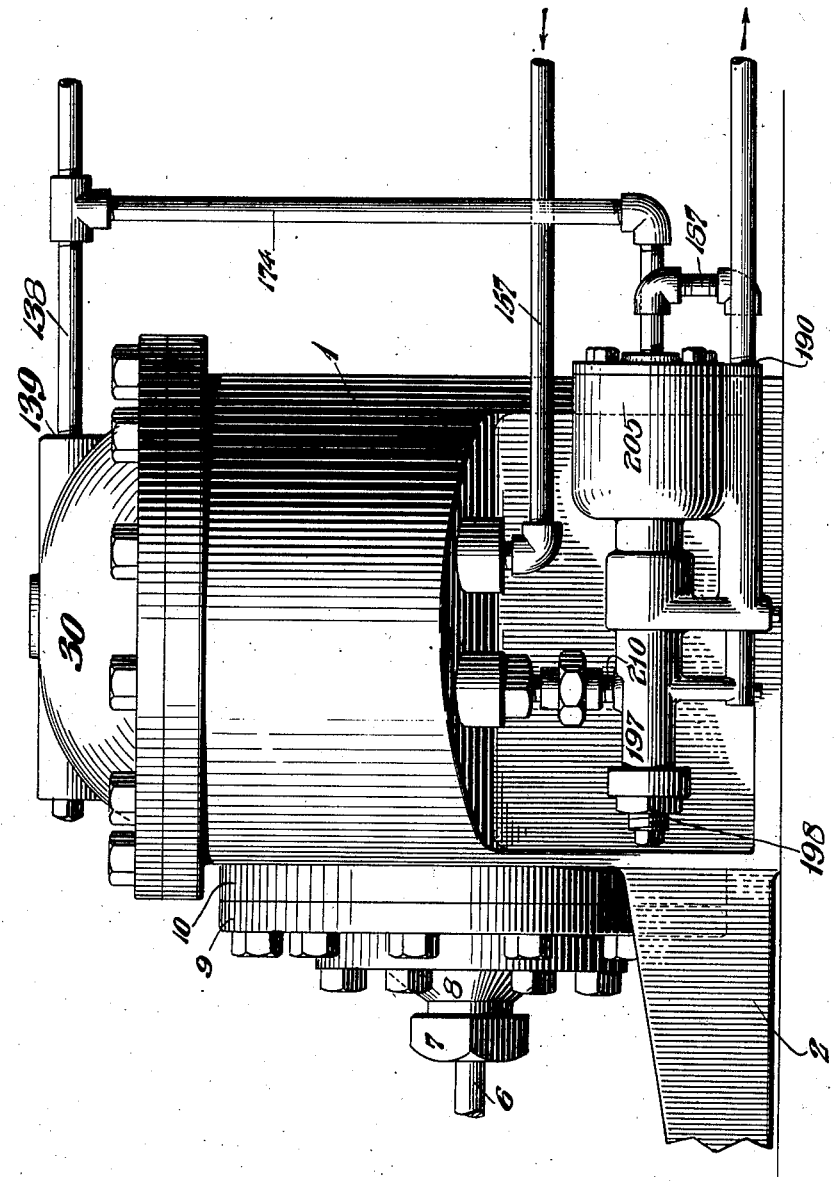

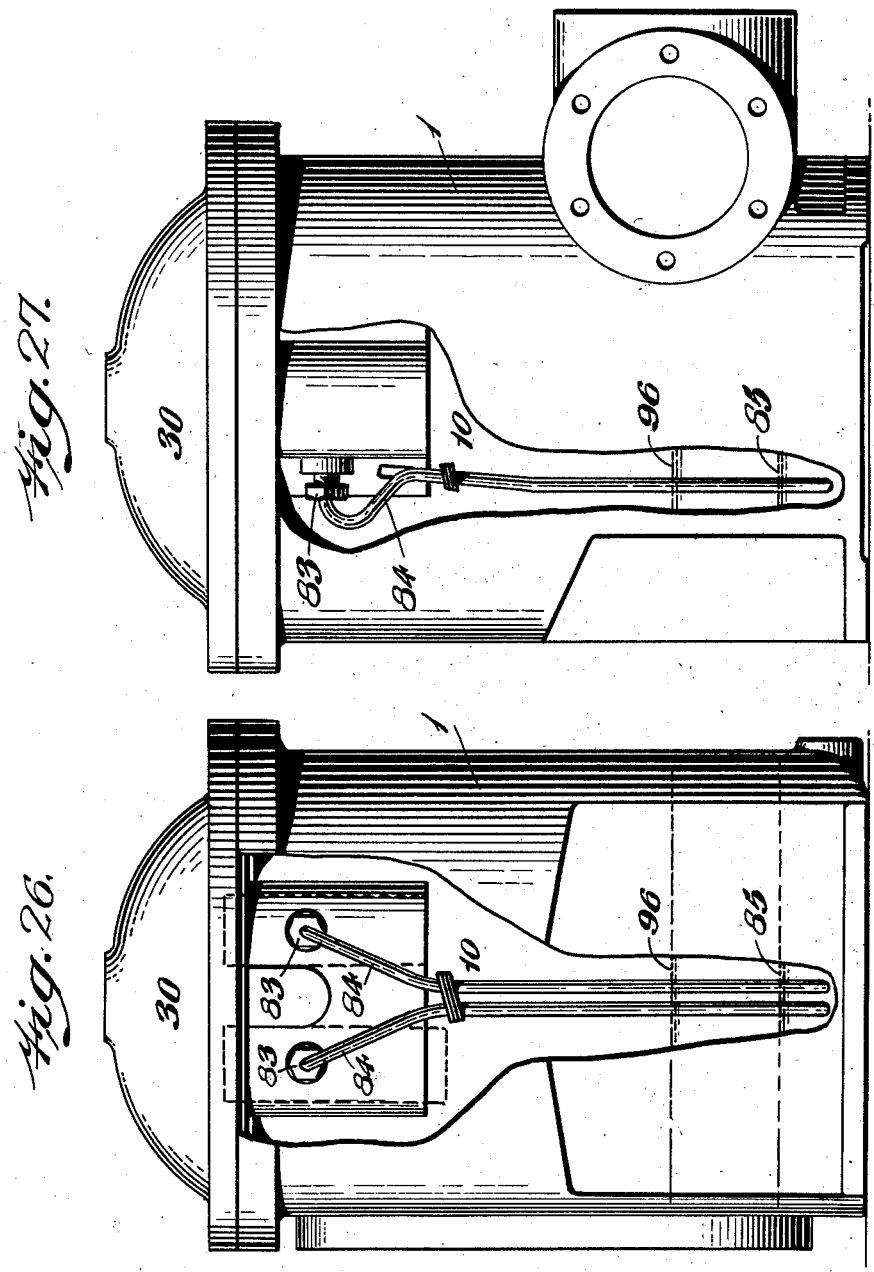

Patented Mar. 22, 1927.

1,622,023

UNITED STATES PATENT OFFICE.

WILLIAM BURLINGHAM, OF TENAFLY, AND RALPH L. LOVELL, OF CRANFORD, NEW JERSEY, ASSIGNORS TO ADAMS, LOVELL, BURLINGHAM, INC., OF JERSEY CITY, NEW JERSEY, A CORPORATION OF NEW YORK.

COMPRESSOR FOR REFRIGERATING SYSTEMS.

Application filed December 31, 1924. Serial No. 759,064.

Our invention relates to a novel refrigerating system and more particularly to that type in which no ice is primarily employed, as a refrigerating medium, but instead a suitable chemical.

Our invention comprises in its broad aspects a novel construction of a compressor, having a novel lubricating system a novel feed system, and novel gas check stuffing box, valves and reciprocating parts.

It further comprises a novel construction of an evaporator, having a novel suction system, feed system, baffle system, ice freezing pans and air cooling surfaces.

It further consists of a novel water flow regulator having a novel pressure system, vacuum system and a combination vacuum and pressure system.

It further consists of a novel temperature regulator, having a double siphon and an hydraulic system for operating the switches.

By the foregoing a novel and compact refrigerator system is produced which can be installed in an ordinary house refrigerator and operated from an electric light socket at a minimum of expense or our device can be used for refrigerator railway cars or in any other situations where refrigeration is economically desired.

It further consists of numerous novel features of construction and advantage, all as will be hereinafter fully set forth and pointed out in the claims.

For the purpose of illustrating our invention, we have shown in the accompanying drawings forms thereof which are at present preferred by us, since they will give in practice satisfactory and reliable results, although it is to be understood that the various instrumentalities of which our invention consists can be variously arranged and organized and that our invention is not limited to the precise arrangement and organization of these instrumentalities as herein shown and described.

Figure 1 represents a vertical diagrammatic view of a refrigerator system embodying our invention, certain parts being shown in section.

Figure 2 represents a side elevation of the electric motor and compressor cylinder.

Figure 3 represents a plan view of the same.

Figure 4 represents a section on line 4—4 of Figure 3, viewed in the direction of the arrows.

Figure 5 represents an end view of the compressor housing.

Figure 6 represents a longitudinal sectional view of the compressor housing and its adjuncts.

Figure 7 represents a vertical sectional view of the compressor housing cap and the valves therein assembled.

Figure 8 represents a vertical sectional view of the compressor on a reduced scale from that seen in Figure 7, with the valves and their adjuncts removed.

Figure 9 represents a transverse sectional view of the compressor cylinder on line 9—9, of Fig. 8.

Figure 9$^a$ represents a transverse sectional view of the valve chambers, on line 9$^a$—9$^a$, Fig. 8.

Figure 10 represents a vertical sectional view of a pair of valves and their adjuncts assembled.

Figure 11 represents a vertical sectional view of a plug in detached position.

Figure 12 represents a perspective view of the delivery valve guide in detached position.

Figures 13 and 14 represent sectional views of the bushings for the delivery and suction valves.

Figure 15 represents a sectional view of the suction valve guide.

Figures 16 and 17 represent side elevations of the delivery and suction valves respectively.

Figure 18 represents a longitudinal sectional view of the water regulator and its adjuncts.

Figure 19 represents a longitudinal sectional view of Figure 18.

Figure 20 represents a section on the line 20—20 of Figure 18.

Figure 21 represents a section on the line 21—21 of Figure 18.

Figure 22 represents a longitudinal sectional view of a single water valve element which may be employed in small units.

Figure 23 represents a plan view of Figure 22.

Figure 24 represents an end view of Figure 22.

Figure 25 represents a side elevation of the compressing cylinder and its adjuncts.

Figures 26 and 27 represent elevational views of the compressor cylinder broken away to show the connection of the lubricating pipes.

Figure 28:
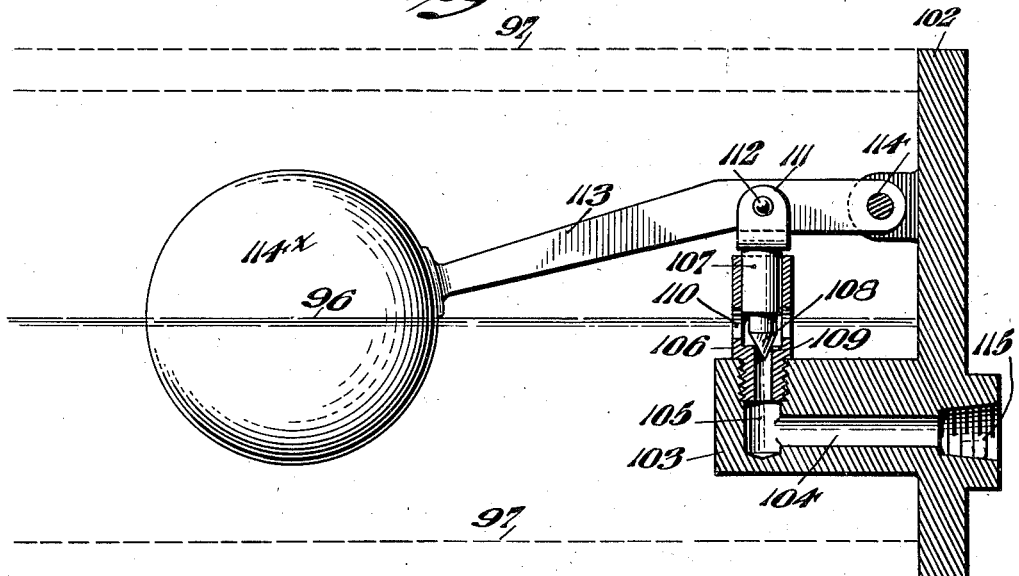

Figure 28 represents a sectional view, partly in elevation, of the float actuated mechanism.

Figure 29:
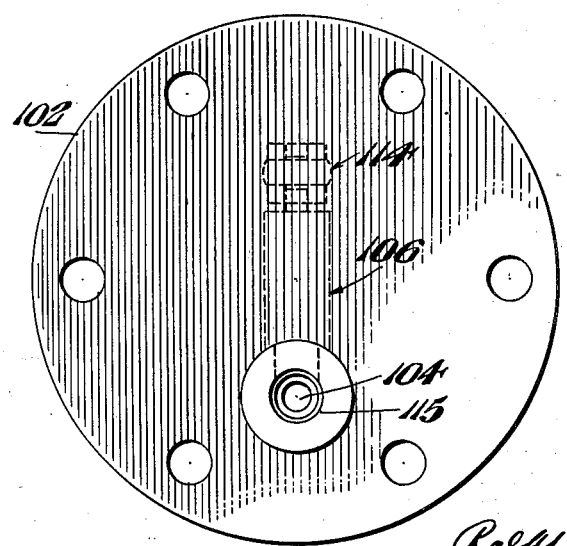

Figure 29 represents an elevation of the head seen in Figure 28, which carries the float mechanism.

In carrying out our invention, we preferably employ the following elements, functioning consecutively or in sequence substantially as follows and whose operation will be hereinafter described in detail in the following sequence, to wit:—

(a) compressor; (b) evaporator; (c) the water flow regulator; and (d) the temperature regulator.

In connection with the compressor, we employ in the practical operation thereof (a) a lubricator system; (b) a feed system; (c) gas check stuffing box; (d) valves and (e) reciprocating parts.

In the practical embodiment of our evaporator the latter comprises (a) suction system; (b) feed system; (c) baffle system; (d) ice freezing pans; and (e) air cooling surfaces.

In the water flow regulator, we employ (a) a pressure system; (b) a vacuum system and (c) a combination pressure and vacuum system.

In the temperature regulator, we employ (a) a double siphon; and (b) a hydraulic system for operating the switches.

It is obvious that the general arrangement of the above parts and the details of construction thereof may be somewhat varied, but we have found from practical tests of our apparatus that the best results have been attained by the novel mechanisms and structures substantially as shown in the drawings, whose construction and function will now be described in sequence, reference being first had to the compressor and its adjuncts.

*The compressor.*

The construction of the compressor will be best understood from Figures 1 to 6, wherein 1 designates the compressor, which is mounted upon a suitable bed or base 2, upon which is supported the electric or other motor 3, whereby the motor shaft 4 is rotated, said shaft carrying the flexible coupling 5 of any conventional type, whereby the compressor shaft 6 is rotated, said shaft passing through a stuffing box 7 of any standard or conventional type, said stuffing box being in the head 8 bolted to the lateral closure 9, which is bolted or otherwise secured to the open end of the vertical compressor housing 10, said head flange 9 carrying the main bearings for all the rotary elements of the compressor. The head 8 and the lateral closure 9 are so constructed that a chamber 11 is formed between them, as will be understood from Figure 6, in which is contained the auxiliary gas check diaphragm 14, which performs an important function in our apparatus and will now be described in detail.

The compressor shaft 6, see Figure 6, at its right-hand portion within the compressor housing 10, is of somewhat enlarged diameter as indicated at 18 and carries thereon, within the chamber 11, the collar 12, which is pinned or otherwise secured to the compressor shaft 6, and is provided with the flange $12^x$ against which seats the non-rotatable bearing ring 13, which is brazed to the metal diaphragm 14, which has its outer periphery 15 secured between the flanges of the head 8 and the head flange 9.

The parts 12 and 13 have their juxtaposed surfaces closely in contact, this contact being assured by the resiliency of the diaphragm 14, whose outer periphery is rigidly held in position when the head 8 is bolted in place.

16 designates an inwardly extending elongated bearing cast on the head flange 9 within which is contained the bushing 17 within which the enlarged portion 18 of the compressor shaft 6 rotates. The upper portion of the elongated bearing 16 is provided with the wall 19 at its inner end and the side walls 20, whereby a reservoir is formed, as indicated at 21, which receives glycerine or other lubricant, which flows through the ports 22 and $22^x$ to the contiguous surfaces of the crank shaft 18 and the bushing 17.

It will be understood, as will be hereafter explained, that there is a considerable pressure created within the compressor housing 10 and that any lubricant tending to flow outwardly within the bushing 17 will be arrested in the chamber 23 within the diaphragm and will tend to be retained therein, but that any lubricant leaking into the chamber 23 is utilized to lubricate the contacting surfaces between the parts 13 and 12.

Any leakage thrown out by centrifugal force from the two surfaces of the parts 12 and 13 will be received in the chamber 11 under atmospheric pressure, and any lubricant now on the contiguous surfaces of bushing 17 shaft 18 and chamber 23 acts as an efficient gas seal against the exit of the volatile gases from the interior of chamber 10 to the atmosphere.

In order to reduce the cost of assembling, inspection and dismantling and to insure exact alignment of the rotary parts, we provide the head flange 9 with the lower base member or extension 24 carrying the end bearing 25, which is provided with the bushing 26, within which the outer end 27 of the crank shaft rotates, said bushing and bearing being provided with a suitable lubricating port 28. The end bearing 25 is centered within the seat or hollow boss 29, so that it will be apparent that in the assembly of the compressor elements, there is no liability for any of the rotating parts to get out of proper alignment under any conditions, it being understood that the bearing 25, base portion 24, the head flange 9 and the bearing 16 are a unit.

It is desirable in compressors of this character to construct the various elements, so that the same may be readily accessible and assembled or dismantled with equal readiness. For ease and rapidity of construction and assembling, we provide the top of the compressor housing 10 with a detachable cap or cover 30 having the two cylinders 31 and 32 cast integral therewith, said cylinders being provided with the pistons 33 and 34 respectively, which are provided with connecting rods 35 and 36, which are coupled to the cranks 37 and 38 in any suitable or conventional manner.

It will be apparent that by the construction seen in Figure 6 the cylinders and pistons can be very readily and cheaply constructed and assembled, and that the pistons, cross head pins, connecting rods, crank shaft, diaphragm gas check and stuffing box can all be erected as a unit before their assembly in the compressor housing 10, thereby enabling the manufacturer to assemble these elements in a very rapid and convenient manner.

The collocation, construction and mode of operation of the valves will be understood from Figures 3, and 7 to 10. The valve chambers 39 and 40, are provided with the ports 41 and 42, which communicate with the cylinders 32 and 31 respectively, said ports 41 and 42 functioning as suction ports for the gas to said cylinders 32 and 31 respectively.

At the top of the valve chambers 39 and 40 are located the ports 43, 44, and 45, said port 43 functioning as a delivery from the valve chamber 39 through the passage 46 communicating with the interior of the compression chamber 10.

The delivery port 45 acts as a delivery port from the valve chamber 39, delivering through the passage 47 communicating with the interior of the compression chamber 10.

Passages 48, 49, 50, 51, and 52 are used to convey the gas to the bottom of the valve chambers 39 and 40.

53 designates one of the suction and delivery valves and as the construction of both of these valves is identical, a description of one will suffice for both, reference being had to Figures 10 to 17.

The valve 53 is composed of the delivery valve 54 and the suction valve 55, the delivery valve 54 comprising the valve member proper 56 and the stem 57.

The suction valve 55 comprises the valve proper 58, the depending stem 59 and the extension 60 of reduced diameter. The suction valve 55 is positioned in the suction valve guide 61, which is composed of the disk-like member 62 having the series of ports 63 therein, said member being provided with the upward tubular extension 64, which serves to guide the portion 59 of the valve stem, the depending portion of reduced diameter being guided in the extension 65.

The difference in the area of the two valve stem members 59 and 60, operating in different holes 64 and 65 acts as a dash-pot member due to the enclosed casing, to prevent the seating of the valve with a shock.

The suction valve seat and casing 66 comprises the lower tubular or cylindrical member 67, in which a disk 62 is snugly fitted, the valve seat being indicated at 68 upon which the valve 58 seats downwardly.

The delivery valve 56 has its stem 57 positioned in the tubular extension 69 of the valve guide 70, which comprises the disk like member 71 having the ports 72 therethrough.

The upper end of the port 69 is provided with a plug 73 so that when the parts are assembled, the upward movement of the valve stem is cushioned.

The delivery valve seat and casing comprises a cylindrical member 74, having its valve seat 75 in its lower portion, upon which the valve 56 seats, it being apparent that the valve guide is assembled at the top of the cylinder 74, the disk 71 having a nice sliding fit in the top of the cylinder 74.

Referring to Figures 7, 10 and 13, it will be apparent that the cylindric member 74 has a short downward extension extending one half way round the bottom of the cylinder or about three-sixteenths of an inch in practice, which is indicated at 76 and acts as a spacer or distance piece so that the valve seats will be positioned at a proper distance apart as will be understood from Figures 7 and 10.

By our manner of constructing the delivery and suction valves and their adjuncts, as seen in Figures 10 and 17 it will be apparent that the same can be very readily assembled in their valve seats, as it is only necessary to drop the assembled suction valve into the proper valve chamber and then to drop on top of it the assembled delivery valve guide and seat, the parts now appearing as seen in Figure 10, after which the plug 78 is screwed into the threaded seat 79, until the boss 80 contacts with the top of the delivery valve guide whereby the chamber 81 is located to register with the ports 41 and 42 respectively and the chamber 82 registers with the ports 43, 44, 45 respectively.

*The compressor lubricating system.*

There has heretofore been considerable difficulty in compressors of this general character in properly lubricating the same; an emulsion of the lubricant and chemical forming and thus necessitating the addition of separating devices for separating the chemical from the lubricant after the lubricant has been used. We have consequently devised our novel lubricant system, whereby heat of compression and the pressure of each piston in its cylinder is utilized to prevent this objectionable emulsion, the mechanism which we have employed in practice and to great satisfaction being best shown in Figure 6, wherein the cylinders 31 and 32 are tapped at the points 83, which are just above the top of the pistons when they are at the end of their down stroke causing the vacuum in their respective cylinders.

84 designates a pair of lubricant pipes having their upper ends in threaded engagement with said tapped holes 83, their lower ends of said pipes being immersed in the lubricant 85, contained in the bottom of the compression chamber 10, the lubricant level being indicated in Figure 8, and the chemical level above said lubricants being also indicated in said figure. By this construction, it will be apparent that during the reciprocation of the pistons an adequate supply of the lubricant in the form of globules instead of comminuted particles will be delivered through the ports 83 at the end of the down stroke of each piston, causing the vacuum in the respective cylinders. After the lubricant enters the cylinders the upward stroke of each piston cuts off the supply of lubricant and compresses the contents of both cylinders, to wit the lubricant and chemical, until the pressure in the cylinder is sufficient to open the delivery valves 54. The compressed lubricant and chemical is then delivered through said valves 54, and passes thence through the ports 72 ports 43, 44 and 45 into the delivery passage 46 and thence it impinges upon the cooling coil 86, which is positioned in the compression chamber 10 and surrounds the cylinders 31 and 32 as will be understood from Figure 8.

It will be evident that the commingled lubricant and chemical cooled by coil 86, will drop partly into the reservoir 21, and partly into the oil box 28, the remainder falling into the bottom of housing 10.

It will be noted that the bottom wall of this upper passage 46 is formed by the circular head 87 of the cylinder, which, it will be understood from Figures 6 and 7, is so constructed with an overhang so that the commingled lubricant and chemical, which strikes the surface 87 will drop therefrom upon the coils 86 and thence into the reservoir 21 and the oil box 28, any overflow falling to the bottom of the compressor housing 10.

It will be apparent that the commingled lubricant and chemical, which drips from the overhang 87 does not touch and is not affected by the rapid rotation or reciprocation of any of the moving parts within the compression chamber, and there is therefore no emulsion formed by this reciprocation which has heretofore required the employment of separating devices of various types which we are enabled entirely to dispense with.

Sufficient lubricant however, is supplied to the connections of the connection rods 35 and 36 and their respective cranks by a small quantity of lubricant which is scraped by the pistons from the cylinder walls during their reciprocation, which effects the lubrication of the cross head pins and the connection between the connecting rods and their cranks.

It will be understood from the foregoing that the lubrication of our novel compressor is entirely automatic under all conditions and after the apparatus is once assembled with the proper amount of lubricant and chemical supply, it requires no further attention on the part of the operator.

This lubrication system is operative as long as the bottom of the lubricating pipes 84 are immersed in the lubricant, irrespective of the height of the level of the lubricant.

We find that if there is not sufficient lubricant in the chamber 10, that it is impossible to secure the desired vacuum in the cylinders 31 and 32, but that if there is a sufficient supply, the desired vacuum is always maintained.

*The cooling coil.*

The cooling coil is indicated at 86, seen in Figures 6 and 8 and its detailed construction will next be described.

The function of the cooling coil 86 is primarily to extract the heat taken up by the gas from the air cooled in the refrigerator and also the heat of the compression generated by the compression of said gas in the cylinders 31 and 32.

It will be obvious that the inlet and outlet for the cooling coil can be connected up to any suitable source of supply for the cooling medium, but in practice we connect the inlet end with the bushing, which is located in the wall 90 of the chamber 10, the lower end of said bushing being threaded or having a nut thereon, the pipe connection from the city main or water supply being secured or coupled to the threaded end thereof. The cooling medium passes into the inlet of the coil 86, and after circulating therethrough leaves said coil through the outlet end, which is secured in a bushing having the same construction as the bushing 89 as already described.

In practice we locate the bushing inlet and outlet ports 89 and 94 in such manner as to allow our dropping the coil into place in the most convenient way.

In practice we connect the inlet 92 with the city main or water supply and the outlet thereof with the water flow or shut off valve which will be hereinafter described.

The feed system for the chemical.

As heretofore explained, the chemical being entered with the lubricant is superposed on the top thereof within the compression chamber 10, the chemical level being indicated at 96 in Figure 8.

It is obviously desirable that automatic means be provided for controlling the supply of the chemical to the evaporator, or in other words to control automatically the variation of the chemical level and while this can be done in various ways, we have found the following to be preferable.

The compressor housing 10 is provided at one side thereof as indicated in Figure 8 with a regulator chamber 97, the wall 98 of which acts as a baffle to prevent the surge or wave motion of the chemical within said housing 10 from affecting the level of the chemical in the chamber 97, which is also provided with a gas outlet 99.

The inner wall 98 is also provided with holes 100 for the purpose of furnishing a supply of chemical from the chamber 10 into the chamber 97, so that the levels of the chemical and of the lubricant in chamber 10 are maintained.

The wall 98 is extended below the surface 96 of said chemical in order to prevent any wave motion in the chamber 97 and also to prevent any flow of glycerine from entering said chamber, as the upper level of the chemical is much freer from glycerine mixture or from glycerine particles than the lower part of the chemical.

The outer end of the chamber 97 is provided with a flange 101 against which is bolted the head plate 102. 103 designates an inwardly extending portion having the longitudinal passage 104, therein which communicates with the upwardly extending passage 105, which is provided with a valve into which is screwed the combined valve seat and valve guide 106.

107 designates a valve rod or guide whose lower end terminates in the conical valve 108, whose seat is indicated at 109, directly above which are the inlet ports 110 for the chemical, it being apparent that as said valve is seated and unseated the flow of chemical through the port 110 is controlled. The upper end of said valve guide 107 is provided with the ears 111 in which is fulcrumed at 112 the float lever 113, one end of which is pivotally secured at 114 in the ears projecting from the head flange 102, the opposite end of said lever 113 carrying the float 114ˣ.

It will be apparent that as the chemical level indicated at 96 changes the float 114ˣ will rise and fall, actuating according to requirements the valve 108 and permitting the chemical when said valve is unseated to flow through the passages 105 and 104 into the pipe 115, which leads to the bottom of the evaporator 116, as best seen in the diagrammatic view in Figure 1.

The chemical which we have heretofore referred to is preferably ethyl chloride, which we find harmless to the user of a household refrigerator and is therefore suitable for installation in families.

It will however be understood that other chemicals may be employed and we do not desire to be limited to any particular form or combination of chemical in our device.

The evaporator.

The evaporator may be positioned in the refrigerator or cooling device in any desirable location with respect to the compressor and its adjuncts, which we have hereinabove described, and while we have shown the same in the present instance, as will be understood from Figure 1, as positioned in the upper part of the refrigerator, it will be understood that the evaporator may be located at other points, if desired, without departing from the spirit or scope of our invention.

117 and 117ˣ designate the inlets to the bottom and top of the evaporator into which the chemical pipe 115, having the branch 116ˣ discharges the liquid chemical at 117 and the entrained gas at 117ˣ.

The water regulator.

It is desirable to regulate automatically the flow of water or cooling medium through the coils 86, seen in Figures 6 and 8, it being understood that the water is conducted to the inlet 92 by a pipe 157 leading thereto from the city main or other source of supply, which we effect by a water regulator 158, which is controlled automatically by variations of pressure in the vacuum and pressure lines of the compressor, see Figures 18 to 21.

The water having been introduced to the coil 86 through the pipe 157 after flowing therethrough, flows through the outlet 95 to the port 159, see Figure 18, passage 160 and port 161 of the lining or bushing 162, in which is contained the valve composed of the pistons or heads 163 and 164 joined by the neck 165. The head 164 has a threaded extension thereon, which is screwed into the nut 167 having the flange 168 to which is secured one end of the corrugated member 169, whose other end is secured to the plate 170 secured to the head 171, wherefrom it will be seen that a closed chamber 172 is formed, with which communication is had by the nipple 173, which extends through said head 171, said nipple 173 being connected to the suction line 138 by the pipe 174, so that it will be apparent that while the compressor is working, any variations of the vacuum in the line 138 will be imparted to the closed chamber 172, so as to actuate the valve connected therewith by the threaded extension 166.

The piston or head 164 of the evaporator member, controls the port 175, which leads to the passage 176 and to the port 177 which is controlled by the valve composed of the heads 178 and 179 joined by the neck 180. The head 178 of the valve has the threaded extension 181 thereon which is secured to the nut 182.

The nut 182 is secured to the plate 183, which is secured to the corrugated member 184 whose opposite end is connected to the plate 185 which has secured to it the member 186 from which leads the pipe 187 to the threaded opening 188 in the lower portion of the compressor chamber 10, as will be understood from Figure 6.

The head 179 controls the outlet port 189, which leads to the exit passage 190. It will be seen from the foregoing that we have provided means for controlling the water supply to the member 186 by variations of compression in the compression chamber, together with means for shutting off the supply of continuous water by variations of pressure in the evaporator.

191 designates a spring seen at the left of Figure 18, one end of which bears upon the shoulder 192 and the other end of which bears against the nut collar 193 which is screwed into the end of the extension 194, the function of the spring 191 being to exert a pull upon the flange 168 to the left on account of the vacuum in the interior of said chamber 172.

195 designates a plug or closure of the left hand end of the valve chamber, which upon being removed permits a screw driver or suitable implement to be applied, so that the threaded extension 166 can be screwed in or out of the nut 167, whereby the position of the valve heads 163, and 164, relative to the ports 161 and 175 can be adjusted so that a convenient means is provided for adjusting the point of cut off of the water valves while the compressor is in operation.

The end of the valve casing 197 is closed by the plug 198 bearing against one end of the spring 199, the other end contacting with the head 179. The head 179 is provided with a terminal 200 having a slot 201 therein so that upon the removal of the plug 198, by means of a screw driver or similar implement inserted in the slot 201, the threaded extension 181 can be rotated within the nut 182, so as to adjust the position of the heads 178 and 179 with respect to the ports 189 and 177.

In many of the prior water regulating valves, the varying pressure of the city supply of different cities has had a tendency to affect their operation. In our case, we have made these balancing valves having the heads 163, 164, and 178 and 179 of such area that the water pressure in the chambers between the aforesaid heads is equal in both directions and has no tendency to move the valve in one way or the other.

It is evident that no matter how close is the fit of these valves in their bushings 162, there will still be a slight leakage of water into the chambers 206 and chambers 203 and 202.

To avoid the accumulation of pressure due to this leaking water, we have provided the passages 204, in the wall 205, of the chamber 206. A hole 207 connects with the chambers 203 and 202 at one end and at the other with the passages 208 and 190, therefore suction will withdraw the waste water through the holes 204 from the chamber 206 and through holes 207 from chambers 202 and 203, thus keeping the chambers free of waste water.

In very small units, we deem it of advantage to reduce the cost of production of this machine by utilizing a single water valve 209, as shown in Figure 22, wherein the inlet 210 seen in Figure 36 corresponds with the inlet 159 already described.

The water after entering the inlet 210 flows into the passage 211, and thence to the ports 212 of the bushing 213 into the chamber 214 between the valve heads 215 and 216 of the valve 217, said heads being joined by the neck 218.

The head 216 has a threaded extension 219 thereon, which engages the nut 220, which is secured to the plate 221 to which is secured one end of the corrugated metal chamber 222, the other end thereof being secured to the plate 223 having the nipple 224 which projects through the cap 225 which is preferably threaded to the outer end of the valve casing.

The head 215 has the teat 226 thereon which is provided with a slot 227. Upon the removal of the plug 228, a screw driver or other implement can be applied to the slot 227, whereby the threaded extension 219 can be turned or adjusted in its nut 220, so as to position the valve heads 215 and 216 with respect to the ports 212 and 213, the latter port leading to the outlet passage 229 which leads to the passage 230.

231 designates a spring contained in the chamber 232, one end of which bears against the inner end of the plug 228, the other end bearing against the head 215, said spring 231 tending to force the valvular member and its adjuncts to the right against the pressure.

233 designates a passage leading from the chamber 232 to the passage 234, which communicates with the passage 229.

The inclined port 235, see Figure 22, serves to convey any water which may flow into the chamber to the exit passage 230.

It will consequently be seen from the foregoing that we have provided means for operating the water supply to a condenser coil, in which the means for regulating the amount of water supply and the point of shut off of the water is controlled by variations of pressure in the compressor chamber 10.

It will be understood that there is a connection from the nipple 224 to the point 188 of the compressor chamber 10. We have numbered this connection 187 as it is the same connection and performs the same function as the connection 187 already described.

The cycle of operations in our novel refrigerating system is as follows:—

Referring first to Fig. 1. The outline shows the refrigerator proper with evaporator 116 located in the usual ice chamber, below which is the compressor 1 and motor 3 in a special compartment. This motor and compressor may be located outside the refrigerator if desired at any convenient point.

The compressor chamber is connected to the evaporator by feed supply pipe 115 and gas suction pipe 138. The condensing water inlet and outlet are shown at 157 and 187 respectively and the power lines to the motor through thermostat 237 and switch 256.

After the machinery has been installed and tested for tightness, the air is exhausted from the evaporator and compressor and from the latter is released to the atmosphere through a tapped hole in the top of the compression chamber. This hole is then closed and the ethyl chloride released from a supply tank and admitted to the evaporator through tapped hole 156 Figure 25. As the compressor is now operating, the incoming ethyl chloride is immediately drawn into the compressor and condensed until the level of the liquid gas has reached the height necessary for operating the feed float which opens the entrance to the feed supply line and the gas begins to return to the evaporator.

The evaporator then fills from the supply tank to the desired level which is about two thirds its height. After the compressor has operated for a few minutes, the tapped hole in the top of the compressor should be opened until the entrained air is entirely removed from the system.

The system is now ready for operation at any time. We will assume that the thermostat is set to keep the interior of the refrigerator at 45° Fah. The increase of one or two degrees above this temperature throws the switch through the thermostatic control, starting the motor compressor. The suction stroke of the pistons immediately begins to draw the gas from the evaporator through pipe 138 reducing the pressure above the liquid in the evaporator and accelerating the transformation of the liquid ethyl chloride into gas, and during this evaporation, a certain amount of British thermal units are extracted from the refrigerator air content, through the medium of the evaporator walls and ethyl chloride. The gas drawn into the compressor through pipe 138 is compressed in the cylinders and delivered under pressure against the condenser coils 86, in the compressor chamber 10, where the cooling coils complete the transformation of the ethyl chloride gas into liquid form and it falls to the bottom of the compressor chamber 10. As soon as the surface level of the liquid ethyl chloride has reached the height 96 Figure 28 the float $114^x$ will lift raising valve 108 and admitting the gas into passages 105 and 104 from thence it passes through pipe 115 Figure 1 and is delivered into evaporator through passage 117 forced therein by pressure in compression chamber 10 and vacuum in evaporator 116. The pipe 115 is made in shape of a siphon in order that when the machine is still, the gas will not drain back to compression chamber after the pressure in the system has equalized and the hole $117^x$ connecting the top of the siphon with the top of the evaporator, is for the purpose of breaking the suction action of the siphon. This hole also acts to discharge part of the gas delivered into the feed pipe into the gas in the upper part of the evaporator.

The abstraction of the B. t. u. from the various compartments of the system is shown in table following. The vacuum in the evaporator gradually increases until the system is balanced or until the compressor is stopped by the throwing of the switch by the thermostat.

It will be seen that this cycle of events is continuous while the machine is in operation. The condenser coil is connected to a water supply system through an automatic valve, so connected up, that when the compressor stops and the pressure in the compressor chamber becomes lower, a diaphragm connected with valve acts to close said valve shutting off the flow of water to the condenser coil and, vice versa, when the compressor starts to function, the inside pressure is immediately increased and acts upon the diaphragm to open the valve. If the pressure in chamber becomes higher than desired due to increase in atmospheric temperature, the valve is opened wider, increasing the flow of water, so that the working pressure in the compression chambers remains practically constant notwithstanding changes in atmospheric conditions.

The system of lubrication is novel in that it is neither splash nor feed and is shown in Figs. 26 and 27. It is very evident that with the poor lubricating quality of glycerine, which is practically the only lubricant we are able to use, a large amount must constantly flow through the system to insure efficient lubrication and there must be no devices liable to choke or stop and thus prevent the continuous flow. It is also necessary that this lubricant be prevented from being hit by the reciprocating parts and thus breaking the lubricant into small particles making it difficult to separate it from the chemical. The method employed is to use a suction pipe 84 to each cylinder entering the cylinder at the end of the suction stroke or when the piston reaches its lowest position, the other end of this pipe entering the lubricant in the bottom of compression chamber 10. At the end of the stroke a small amount of lubricant enters the cylinder in bulk and is immediately compressed with the gas in said cylinder and the mixture is discharged through the delivery valves of the cylinder upon the cooling coils. The action of the coils upon this mixture is to condense the ethyl chloride and cool the lubricant, which then falls in drops and not in comminuted particles to the bottom of the chamber 10 leaving the ethyl chloride clear and free from the lubricant. There is a circular formation surrounding the pendant cylinders which prevents any of the dropping lubricant from striking the reciprocating parts while the lubricant dropping from the cooling coils fill the lubricant supply box 21 and 28 Figure 6.

The lubricant from the box 21 passes through passage 22, lubricating crank shaft bearing 18, and a portion enters chamber 23. The centrifugal force draws sufficient lubricant between the collars $12^x$ and 13 to lubricate the same and the portion that oozes through between the collars $12^x$ and 13 is retained in chamber 11 and the stuffing box 7 has only to hold this lubricant, which is practically at atmospheric pressure in space 11.

The lubricant thus distributed acts as an efficient seal for preventing the escape of the ethyl chloride gas under pressure in the chamber 10. For this gas to leak out, it must pass through the space between the periphery of the crankshaft 18 and the bearing surface, the lubricant in chamber 23 between sealing collars $12^x$ and 13, the lubricant in chamber 11 and the stuffing box 7. This arrangement insures a seal whether the machine is operating or is still, and the higher the pressure, the tighter the seal between collars $12^x$ and 13.

In order to prevent the agitation of the surface of the liquid surface in chamber 10 from affecting the float valve $114^x$, a baffle 98 Fig. 8 is shown, separating these two chambers. The holes 100 in this baffle allow of entrance of liquid chemical into chamber 97 and prevents the extraction of all the chemical in chamber 10 with consequent rise of lubricant line 85 to the height of 96 in chamber 97 and thus feed lubricant to the evaporator. This could happen should the chamber 10 be filled with lubricant above the bottom of baffle 98.

The tests of our novel refrigerating machine in practical operation over long periods clearly show its advantages and the essential differences between the working of this machine and those at present upon the market, which may be summed up as follows:—

1—It is absolutely reliable.
2—Entirely automatic service.
3—Long life.
4—No danger to house or household.
5—Low original cost to meet popular demand.
6—Capable of installation in refrigerators already in place.
7—Operating cost must be considerably less than cost of ice for equivalent service.
8—It is capable of freezing small cubes of ice quickly and in sufficient quantities to meet the needs of the ordinary family.
9—Avoids leaky joints.

To meet the above conditions, ethyl-chloride is preferably employed as a refrigerating agent, operating through a pressure range between 20 lbs. per square inch above atmospheric and 10 lbs. below atmosphere.

In its broad aspects, our novel apparatus consists of an evaporator installed in the ice chamber of the refrigerator, a novel compressor driven preferably by an electric motor, a condenser for condensing the gases delivered by the compressor, and an automatic valve for controlling the flow of the liquid chemical from the compressor chamber to the evaporator.

The compressor consists of two single acting cylinders. The condenser uses water as the condensing medium. The condenser cylinders, feed mechanism and reciprocating parts are all contained in one chamber.

The lubrication of all wearing parts is entirely automatic, as is also the sealing against loss of gas. The gas leakage around the entrance of the driving shaft into the gas chamber is entirely prevented by a novel design of diaphragm gas check, which operates without any measurable absorption of power through friction.

The condensing water is controlled by the pressure in the compression chamber, so that when the compressor stops the water supply is automatically shut off.

The temperature within the refrigerator depends upon the amount of liquid chemical changed to gas in the evaporator. This change is taking place during the entire operation of the compressor, to control the temperature in the refrigerator, and it is necessary only to control the time period of the compressor operation. This is accomplished by the thermostat in the refrigerator, which controls the starting and stopping of the compressor.

Our above described novel machine will keep an average ice box of 10 to 14 cubic feet capacity at an average temperature of 45° F. in any weather operating not over 6 hours in every 24 hours consuming from 200 to 250 watts per hour. It will also make 1½ pounds of ice in 1″ cubes inside of each hour.

Necessarily when making ice, the electrical energy will be increased proportionally. The following method was used in determining the above figures.

On account of the small size of the machine and the many difficulties attending the arrangement for the usual test, it was determined to obtain the capacity of the machine by ascertaining how many pounds of ethyl chloride it would liquefy and to find out if it would safely and surely handle the same number of pounds and to estimate its capacity by the number of pounds so handled. For if we know the number of pounds handled or evaporated in a unit of time, we know exactly how much heat it will take up or in other words how much refrigeration it will produce under certain conditions of pressure. The amount of heat taken up by the ethyl chloride balanced very well with the calculation of the amount of heat taken up as figured from the lowering of the brine temperature and the other cooling operations.

In Fig. 6 we have shown a pipe 16ˣ leading from below the surface of the lubricant in the condenser chamber to the chamber 23 back of the diaphragm 14, said pipe keeping said diaphragm chamber full of lubricant, by reason of the higher pressure in the condensing or compressor chamber over that in said chamber 23 back of said diaphragm.

It will now be apparent that we have devised a novel and useful construction of refrigerating system, which embodies the features of advantage enumerated as desirable in the statement of the invention and the above description, and while I have, in the present instance, shown and described preferred embodiments thereof which will give in practice satisfactory and reliable results, it is to be understood that the same are susceptible of modification in various particulars without departing from the spirit or scope of the invention or sacrificing any of its advantages.

Having thus described our invention what we claim as new and desire to secure by Letters Patent, is:—

1. In a refrigerating system, a compressor housing, a cap therefor, pendant cylinders open at their lower ends and integral with said cap, a crank shaft, a housing closure having an inward extension integral therewith and carrying the bearings for said crank shaft, pistons in said cylinders, and connecting rods for said pistons.

2. In a refrigerating system, a compressor, a housing, closure therefor provided with integral bearings for the inner and outer ends of the crank shaft, a diaphragm clamp to the outer portion of said closure, and having a stationary member thereon, a crank shaft mounted in said bearings, means for actuating said crank shaft, and a member secured to said crank shaft and in frictional contact with said stationary member for forming a seal in proximity to said diaphragm.

3. In a refrigerating system, a compressor a housing, closure therefor provided with integral bearings for the inner and outer ends of the crank shaft, a diaphragm clamped to the outer portion of said closure, and having a stationary member thereon, a crank shaft mounted in said bearings, means for actuating said crank shaft, and a member secured to said crank shaft and in frictional contact with said stationary member for forming a seal in proximity to said diaphragm, in combination with an outer closure carrying an outer stuffing box for said crank shaft.

4. In a refrigerating system, a compressor housing, a closure therefor provided with integral bearings for the inner and outer ends of the crank shaft, a diaphragm clamped to the outer portion of said closure, and having a stationary member thereon, a crank shaft mounted in said bearings, means for actuating said crank shaft, and a member secured to said crank shaft and in frictional contact with said stationary member for forming a seal in proximity to said diaphragm, in combination with an outer closure carrying an outer stuffing box for said crank shaft, and pockets on the upper portion of said crank shaft bearings for catching the lubricant for the latter.

5. In a refrigerating system, a compressor housing having a detachable cap, pendant open ended cylinders integral with said cap and having an upper overhang extending beyond the moving elements in said housing, a crank shaft, means for actuating the latter, bearings for said crank shaft, and lubricant pockets above said bearing, for catching the lubricant dripping from said overhang for lubricating said bearings.

6. In a refrigerating system, a compressor housing having a detachable cap, pendant open ended cylinders integral with said cap and having an upper overhang extending beyond the moving elements in said housing, a crank shaft, means for actuating the latter, bearings for said crank shaft, and lubricant pockets above said bearing, for catching the lubricant dripping from said overhang for lubricating said bearings, in combination with a housing closure, said crank shaft bearings being integral with said closure.

7. In a refrigerating system, a compressor housing, a cap therefor, pendant piston cylinders integral with said cap or cover, valve chambers also integral with said cap or cover, valves therefor, pistons in said cylinders and means for actuating said pistons.

8. In a refrigerating system, a compressor housing, a closure for one side thereof, crank shaft bearings integral with said closure, and a hollow inner centering boss on the opposite wall for engaging the inner crank shaft bearing.

9. In a refrigerating system, a compressor housing adapted to have its lower portion serve as a lubricant reservoir a cap therefor, piston cylinders carried by said cap, pistons therein, means for reciprocating said pistons, ports in said cylinders positioned above the tops of said pistons when at their extreme inward or bottom of stroke, and lubricant pipes having their upper ends connected to said ports and their lower ends extending below the level of said lubricant.

10. In a refrigerating system, a compressor housing, a cap therefor carrying valve chambers, removable upper and lower bushings therein having juxtaposed seats, a delivery valve having an upwardly extending stem located in the upper bushing, an apertured guide in the upper portion of said upper bushing and having a downward extension for guiding said delivery valve stem, a suction valve in said lower bushing and having a pendant stem and a lower apertured guide in said lower bushing and having an upward extension for guiding said suction valve stem.

11. In a refrigerating system, a compressor housing, a cap therefor carrying valve chambers, removable upper and lower bushings therein having juxtaposed seats, a delivery valve having an upwardly extending stem located in the upper bushing, an apertured guide in the upper portion of said upper bushing and having a downward extension for guiding said delivery valve stem, a suction valve in said lower bushing and having a pendant stem and a lower apertured guide in said lower bushing and having an upward extension for guiding said suction valve stem, in combination with a spacing member intermediate the inner ends of said bushings and a closure having a stem bearing on the top of said upper guide member.

12. In a compressor unit, a crank shaft, a housing chamber, a cap therefor having pendant cylinders supported therefrom, means for erecting all reciprocating parts on said crank shaft before inserting said crank shaft into said housing chamber, and a lateral closure for said housing having a bearing for one end of said crank shaft.

13. In a compressor unit, pendant cylinders, an overhang around said pendant cylinders, so arranged that the lubricant discharged from said cylinders is prevented from dropping on any reciprocating parts.

14. In a refrigerating system, a housing closure having pockets therein, a diaphragm, an outer head containing an outer stuffing box, a crank shaft having an outer collar thereon and a collar secured to said diaphragm and located within and in contact with the collar on said crank shaft and means for enabling lubricant after passing through bearings next to the motor to form a seal in said pockets and at the same time to act as a lubricant for said contacting collars on said crank shaft and diaphragm.

15. In a refrigeration system a cylinder having an aperture in the wall thereof, a piston, a lubricant containing chamber arranged wholly below said piston, and a pipe submerged in said lubricant and connecting with said aperture, said aperture being located above the top of said piston when at the end of the downward stroke, said piston being operative for opening and closing said aperture for admitting lubricant at the end of the vacuum stroke.

16. In a refrigerating system, a housing chamber, a cylinder, a piston, a lubricating system including a lubricant containing chamber arranged wholly below said piston and having piped connection with said cylinder and means for utilizing the difference in pressure between the interior of the housing chamber and the vacuum in the cylinder for forcing the lubricant into the cylinder said means comprising a port in said cylinder located above the top of said piston when at the bottom of its stroke and in connection with said lubricating system.

WILLIAM BURLINGHAM.
RALPH L. LOVELL.